(12) United States Patent
Peter (10) Patent No.: US 7,436,922 B2
(45) Date of Patent: Oct. 14, 2008

(54) ELECTRICITY AND STEAM GENERATION FROM A HELIUM-COOLED NUCLEAR REACTOR

(75) Inventor: Andrew Maxwell Peter, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 73 days.

(21) Appl. No.: 11/313,502

(22) Filed: Dec. 21, 2005

(65) Prior Publication Data

US 2008/0137797 A1   Jun. 12, 2008

(51) Int. Cl.
*G21C 3/56* (2006.01)

(52) U.S. Cl. ............... 376/383; 376/386; 376/391; 376/317; 60/650; 60/652

(58) Field of Classification Search ............ 60/650, 60/652; 376/331, 348, 361, 381, 383, 384, 376/386, 391, 317
See application file for complete search history.

(56) References Cited

U.S. PATENT DOCUMENTS

| | | | |
|---|---|---|---|
| 3,466,871 A * | 9/1969 | Osborn, Jr. et al. ............ | 60/655 |
| 4,257,846 A * | 3/1981 | Pierce ........................ | 376/391 |
| 4,466,249 A * | 8/1984 | Frutschi ...................... | 60/648 |
| 4,576,783 A * | 3/1986 | Koutz ......................... | 376/323 |
| 4,761,260 A * | 8/1988 | Schmitt et al. ............... | 376/298 |
| 5,267,288 A * | 11/1993 | Frutschi et al. ............... | 376/402 |
| 5,428,653 A * | 6/1995 | El-Genk ...................... | 376/318 |
| 5,544,479 A * | 8/1996 | Yan et al. .................... | 60/39.183 |
| 6,674,830 B2 * | 1/2004 | Kato et al. ................... | 376/391 |
| 6,977,983 B2 * | 12/2005 | Correia et al. ............... | 376/383 |
| 7,028,481 B1 * | 4/2006 | Morrow ....................... | 60/649 |
| 2004/0131138 A1 * | 7/2004 | Correia et al. ............... | 376/381 |
| 2004/0196951 A1 * | 10/2004 | Correia et al. ............... | 376/391 |
| 2006/0056572 A1 * | 3/2006 | Lecomte ...................... | 376/383 |

FOREIGN PATENT DOCUMENTS

WO   WO 96/23322   8/1996

OTHER PUBLICATIONS

Patent Abstracts of Japan. JP03208259 A. Publication Date Sep. 11, 1991. "Solid Electrolyte Fuel Cell System". (Abstract Only).
Patent Abstracts of Japan. JP04087976 A2. Publication Date Mar. 19, 1992. "Packaging Device For Electrolytic Condenser". (Abstract Only).
Patent Abstracts of Japan. JP04254796 A2. Publication Date Sep. 10, 1992. "Direct Reduction Of Metal Ore". (Abstract Only).
Patent Abstracts of Japan. JP06093481 A2. Publication Date Apr. 5, 1994. "Method For Electrolyzing High Temperature Steam". (Abstract Only).

(Continued)

*Primary Examiner*—Rick Palabrica
(74) *Attorney, Agent, or Firm*—Patrick K. Patnode (57) ABSTRACT

Disclosed herein is a method comprising heating helium in a core of a nuclear reactor; extracting heat from the helium; superheating water to steam using the heat extracted from the helium; expanding the helium in a turbine; wherein the turbine is in operative communication with an electrical generator; and generating electricity in the electrical generator.

16 Claims, 3 Drawing Sheets

OTHER PUBLICATIONS

Patent Abstracts of Japan. JP06276701 A2. Publication Date Sep. 30, 1994. "Electric Power Storing Device". (Abstract Only).
Patent Abstracts of Japan. JP21160404 A2. Publication Date Jun. 12, 2001. "Power Storage System". (Abstract Only).
Patent Abstracts of Japan. JP09004418. Publication Date Jan. 7, 1997. "Hydrogen Combustion Power Storage Device". (Abstract Only).

* cited by examiner

ELECTRICITY AND STEAM GENERATION FROM A HELIUM-COOLED NUCLEAR REACTOR

BACKGROUND

This disclosure relates to the generation of electricity and steam. In particular, this disclosure relates to the generation of electricity and steam from a helium-cooled high temperature nuclear reactor by means of a closed helium Brayton cycle and a heat recovery steam generator.

Fossil fuel combustion has been identified as a significant contributor to numerous adverse environmental effects. For example, poor local air quality, regional acidification of rainfall that extends into lakes and rivers, and a global increase in atmospheric concentrations of greenhouse gases (GHG), have all been associated with the combustion of fossil fuels. In particular, increased concentrations of GHG's are a significant concern since the increased concentrations may cause a change in global temperature, thereby potentially contributing to global climatic disruption. Further, GHG's may remain in the earth's atmosphere for up to several hundred years.

One problem associated with the use of fossil fuel is that the consumption of fossil fuel correlates closely with economic and population growth. Therefore, as economies and populations continue to increase worldwide, substantial increases in the concentration of GHG's in the atmosphere are expected. A further problem associated with the use of fossil fuels is related to the inequitable geographical distribution of global petroleum resources. In particular, many industrialized economies are deficient in domestic supplies of petroleum, which forces these economies to import steadily increasing quantities of crude oil in order to meet the domestic demand for petroleum derived fuels.

Nuclear reactors do not emit appreciable pollutants or GHG's into the atmosphere and can provide energy independence to economies that are deficient in fossil fuels. The majority of today's nuclear reactors are water-cooled and generate electricity through steam generation and subsequent expansion through a steam turbine. Because of the relatively low temperature steam produced by these reactors (generally below 300° C.), the net thermal efficiency for electrical generation is relatively low (generally below 35%). An additional shortcoming of these reactors is that the steam produced is too cold for many potential industrial applications, such as hydrogen production by steam methane reforming (SMR) of natural gas or hydrogen production by solid oxide electrolysis of steam. Intermediate temperature solid oxide electrolyzer systems generally operate at temperatures of about 700 to about 900° C. Steam undergoes electrolysis in the cathode side of a solid oxide electrolyzer cell to generate hydrogen. Electrical energy is required to electrolyze the steam, so it is desirable to have a nuclear reactor system that can produce high-temperature steam as well as electrical energy.

Graphite-moderated nuclear reactors that are cooled with helium gas can achieve very high helium exit temperatures, from 700° C. to potentially 1,000° C. Many systems have been proposed for the production of electrical energy and high-temperature steam using helium-cooled reactors.

Systems have been proposed that indirectly couple a steam Rankine cycle to the primary helium coolant loop. High pressure steam is generated in a boiler heated by the helium used to cool the primary loop. The high pressure steam is partially expanded through a steam turbine to produce electrical energy. A portion of the partially expanded steam is then reheated through a second heat exchanger heated by primary loop helium. This intermediate pressure reheated steam can then be used for applications such as solid oxide electrolysis. This type of system has a risk of steam ingress into the nuclear core due to the high-pressure steam generators, where the steam can be at a higher pressure than the primary helium coolant. Steam ingress into the core is undesirable because it can corrode the graphite moderator and graphite-coated fuel, and can also cause a reactivity insertion due to the moderating effect of steam.

Other systems have been proposed that indirectly couple a Brayton topping cycle to the primary helium coolant loop and further indirectly couple a steam Rankine bottoming cycle to the Brayton cycle, in a concept known generally as an indirect combined cycle. Heat is transferred through an intermediate heat exchanger to a Brayton cycle employing a compressed gaseous working fluid, such as air or helium. This heated gas is expanded through a turbine to produce electricity. Expanded gas then passes through a heat recovery steam generator to produce steam, which can be expanded through a steam turbine for additional electrical production or alternatively can be used for industrial applications. This system does not produce steam with the required high temperature for solid oxide electrolysis, however. Furthermore, this system requires the use of a very large and expensive gas-to-gas intermediate heat exchanger.

Other systems have been proposed that directly expand the helium through a turbine to produce electricity using a direct Brayton cycle. To produce steam in addition to electricity, systems have been proposed that divert a fraction of the helium coolant exiting the nuclear core to a second loop in parallel with the Brayton cycle loop. Helium in this second parallel loop generates steam in a steam generator. Such systems have several undesirable features—they do not efficiently use the high energy available in the high-temperature helium in the second parallel loop and they use a second compressor in the second parallel loop. In addition, they use a large and expensive gas-to-gas recuperator to transfer heat from the turbine exhaust to the reactor inlet for efficient electrical generation.

It is therefore desirable to have a system that produces both electricity and low-pressure steam using a helium-cooled nuclear reactor in an economical and safe manner.

SUMMARY

Disclosed herein is a method comprising heating helium in a core of a nuclear reactor; extracting heat from the helium; superheating water to steam using the heat extracted from the helium; expanding the helium in a turbine; wherein the turbine is in operative communication with an electrical generator; and generating electricity in the electrical generator.

Disclosed herein too is a system for producing electricity and steam comprising a Brayton power conversion cycle employing helium as the working fluid in a first closed loop wherein the first closed loop comprises a heat source comprising a nuclear reactor; wherein the core of the nuclear reactor is cooled using helium; a power conversion system comprising a turbine, a compressor, and an electrical generator, wherein the compressor, the turbine, and the electrical generator are in operative communication with each other; wherein the turbine is located downstream from the heat source and is in fluid communication with the heat source; a heat recovery steam generator, located downstream of the turbine and in fluid communication with the turbine, where the steam generated is at a pressure that is less than or equal to about the pressure of the helium in the first closed loop; and a waste heat removal heat exchanger, located downstream of the heat recovery steam generator and in fluid communication with the heat recovery steam generator.

DETAILED DESCRIPTION OF FIGURES

DETAILED DESCRIPTION

It is to be noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). It is to be noted that all ranges disclosed within this specification are inclusive and are independently combinable.

Furthermore, in describing the arrangement of components in embodiments of the present disclosure, the terms "upstream" and "downstream" are used. These terms have their ordinary meaning. For example, an "upstream" device as used herein refers to a device producing a fluid output stream that is fed to a "downstream" device. Moreover, the "downstream" device is the device receiving the output from the "upstream" device. However, it will be apparent to those skilled in the art that a device may be both "upstream" and "downstream" of the same device in certain configurations, e.g., a system comprising a recycle loop.

Disclosed herein is a system that produces electricity and low-pressure steam from a helium-cooled high temperature nuclear reactor by using a closed helium Brayton cycle and a heat recovery steam generator (HRSG). In one embodiment, electricity and steam are produced for use in a solid oxide electrolyzer system that is in operative communication with a helium cooled nuclear reactor. This system produces steam and electricity in the proper proportion for use by a solid oxide electrolysis cell or cells for the production of hydrogen, such that the system does not export or import additional steam or electricity to or from external sources.

In one embodiment, the system uses helium as a medium for transferring heat (generated in a nuclear core) to steam that can optionally be electrolyzed into hydrogen and oxygen in a solid oxide electrolyzer cell. The helium is used to cool the core of a high temperature nuclear reactor. The heat extracted by the helium in the process of cooling the core is then used to drive a gas turbine that operates using a direct Brayton power conversion cycle. The gas turbine is in operative communication with a generator that generates electricity. The hot helium is also advantageously used to generate steam that can be optionally used for the generation of hydrogen. The system is advantageous since there is a minimization of the possibility of water ingress into the core of the nuclear reactor because the water and steam at all points in the system are at an equal or lower pressure than the helium coolant. Further, the helium coolant is a single phase coolant that is inert and has minimal reactivity effects.

Figure 1:
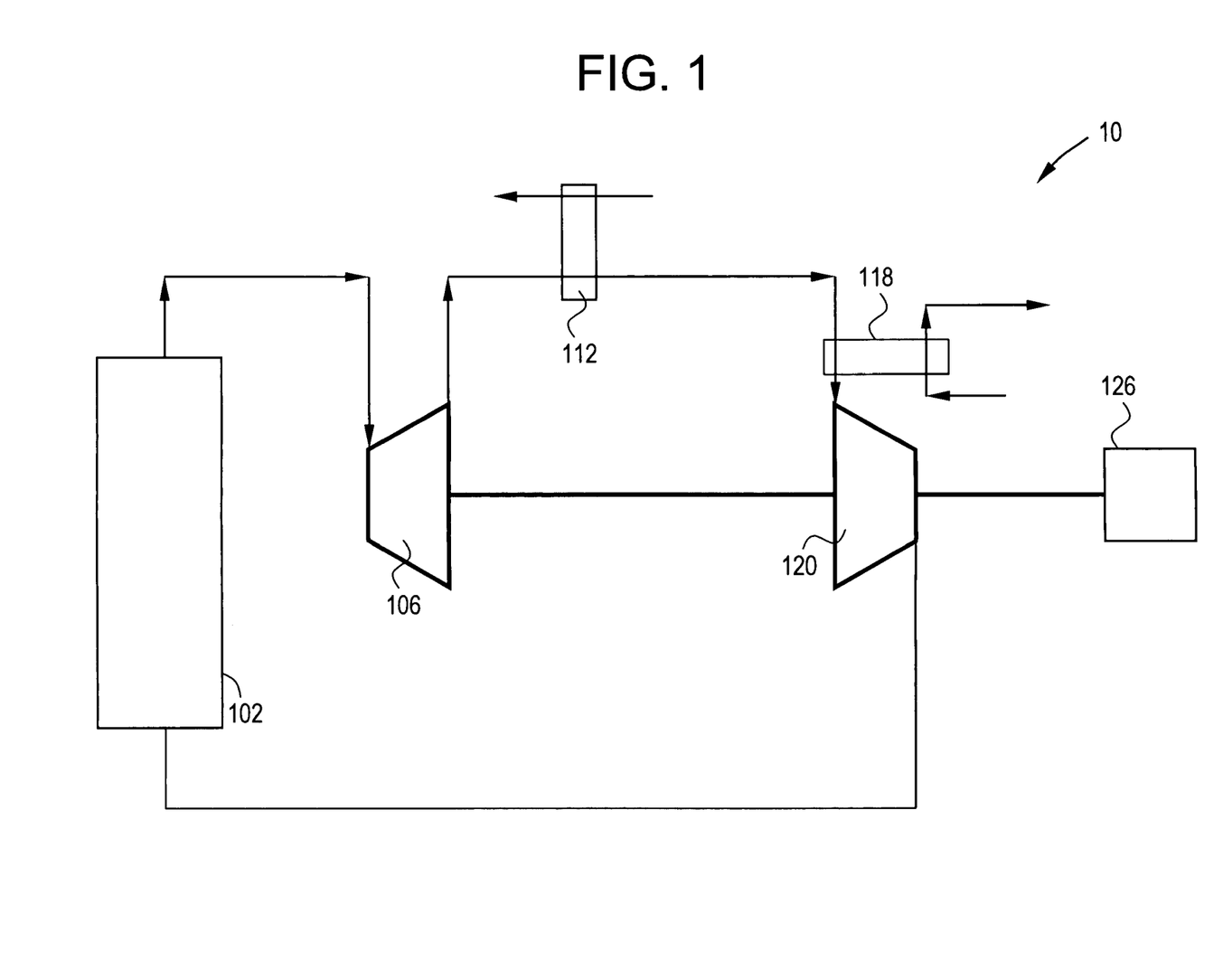
FIG. 1 is a depiction of one exemplary embodiment of a system that can generate electricity and steam using helium in a Brayton power conversion cycle with a heat recovery steam generator.

With reference now to FIG. 1, the system 10 comprises a first closed loop comprising a heat source 102. The heat source 102 comprises a nuclear reactor that employs helium as a coolant. The heat source 102 is in operative communication with a power conversion system comprising a turbine 106, a compressor 120, and an electrical generator 126 that operates on a Brayton cycle. As can be seen in the FIG. 1, the turbine 106 is located downstream from the heat source 102 and is in fluid communication with the heat source 102. A heat recovery steam generator (HRSG) 112 is located downstream of the turbine 106 and is in fluid communication with the turbine 106, where the steam generated is at a pressure that is less than or equal to about the pressure of the helium in the first closed loop. The system 10 further comprises a waste heat removal heat exchanger 118, located downstream of the HRSG 112 and in fluid communication with the HRSG 112.

In one embodiment, the heat source 102 is a nuclear reactor that employs machined graphite blocks as the moderator and as the core structural element. Coated fuel particles containing fissile material are compacted into cylindrical pellets and inserted into holes drilled into the graphite blocks. Helium coolant flows through additional holes drilled through the graphite blocks. In another embodiment, the heat source is a nuclear reactor that employs coated fuel particles containing fissile material that are compacted into pebbles. These pebbles are then assembled to form a "pebble bed" comprising the core of the reactor. Helium coolant flows between the pebbles.

In one embodiment, the power conversion system comprises a turbine 106, an electric generator 126, and a compressor 120 on a common horizontal shaft. In another embodiment, the power conversion system comprises a turbine, an electric generator, and compressors on a common vertical shaft. In one embodiment, the electrical generator may be located at the compressor end of the shaft, as shown in FIG. 1. In another embodiment, the electrical generator may be located at the turbine end of the shaft. In one embodiment, the generator is directly coupled to the shaft and rotates synchronously with the turbomachine. In another embodiment, the generator is coupled to the shaft via a gearbox that reduces the speed of rotation of the generator relative to the turbomachine shaft.

Figure 2:
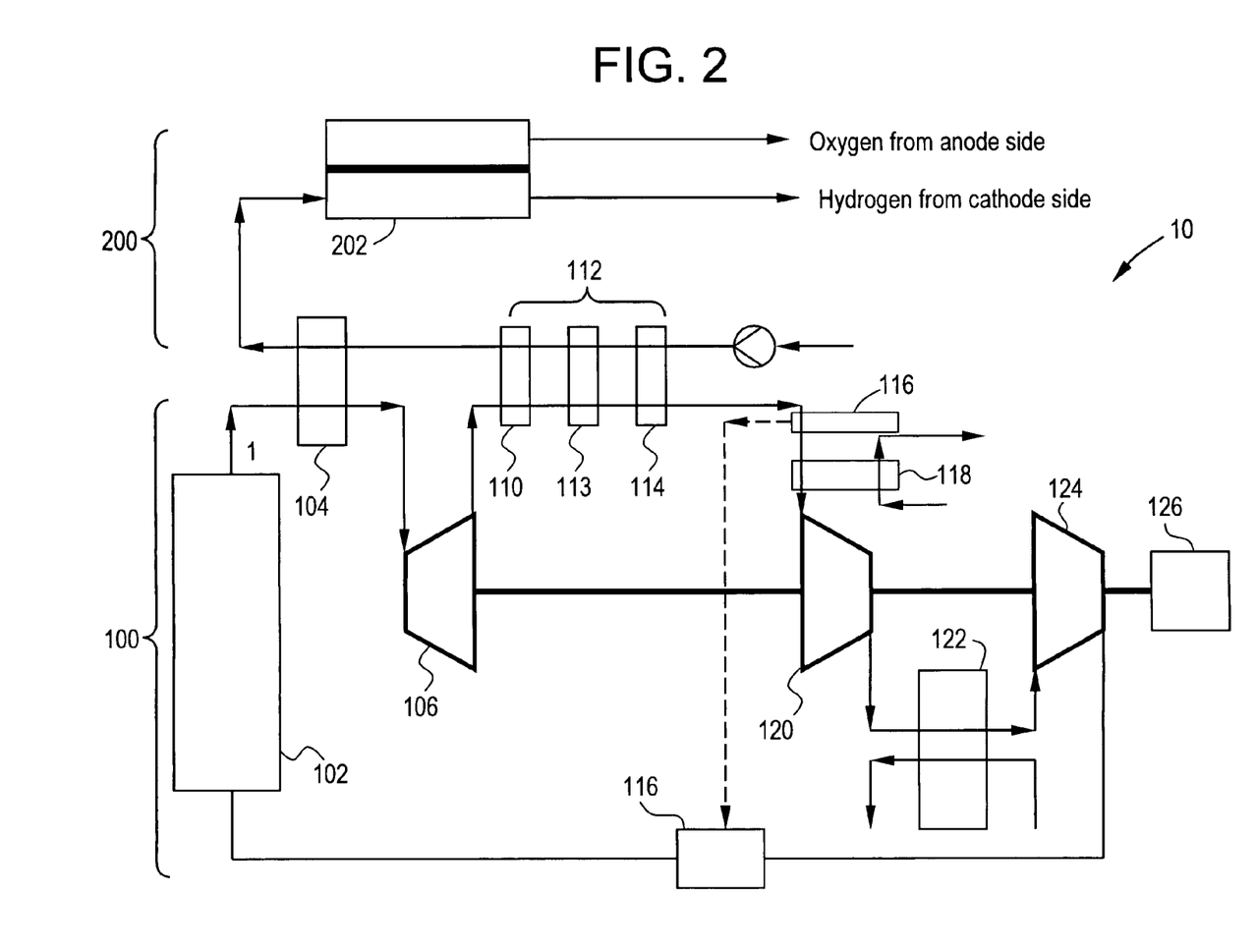
FIG. 2 is a depiction of one exemplary embodiment of a self-sufficient system for generating hydrogen, wherein the electricity and steam needs of the system are met by the system itself, without the importation or exportation of electricity or steam to or from an external source respectively.

The HRSG 112 is operative to extract heat from the helium in the first loop and transfer it to water to convert water into steam. In one embodiment, the HRSG 112 is a shell-and-tube heat exchanger, where hot helium passes over tubes filled with water or steam. In one embodiment, the tubes are coiled. In another embodiment, the tubes have exterior fins attached to improve heat transfer. In an exemplary embodiment, the HRSG 112 is segmented into three sections. Referring now to FIG. 2, the HRSG 112 is segmented into three sections: the steam superheater 110, the steam evaporator 113, and the economizer 114. The steam superheater 110 transfers heat from hot helium to saturated steam generated in the evaporator, and heats the steam to a temperature above its saturation temperature to become superheated steam. The steam evaporator 113 transfers heat from hot helium to saturated liquid water from the economizer, and heats the water causing it to boil and become saturated steam. The economizer 114 transfers heat from hot helium to liquid water and heats the water up to its saturation temperature.

Referring again to FIG. 1, the waste heat removal heat exchanger 118 is operative to remove waste heat from the helium prior to compression in the compressor 120. In one embodiment, the waste heat removal heat exchanger 118 is a shell-and-tube heat exchanger employing water as a cooling fluid. In one embodiment, this cooling water is extracted from a source of cool water such as a lake and is returned to this source after flowing through the waste heat removal heat exchanger. In another embodiment, the cooling water is circulated in a closed loop and is pumped through a cooling tower for ultimate rejection of the waste heat to the atmosphere. In another embodiment, the waste heat removal heat exchanger 118 utilizes forced-circulation air as a cooling fluid.

As detailed in FIG. 2, the system 10 can comprise additional optional features that can be used for the optional generation of hydrogen, if desired. The first loop 100 is in operative communication with a second loop 200 that optionally comprises the solid oxide electrolyzer cell 202. In an alternative embodiment, the second loop 200 may comprise a steam methane reformer in lieu of the solid oxide electrolyzer cell 202. In yet another alternative embodiment, the second loop 200 may comprise a radiator in lieu of the steam methane reformer or the solid oxide electrolyzer cell 202. In one embodiment, the solid oxide electrolyzer cell 202 is an intermediate temperature operating cell that functions at a temperature of about 700 to about 850° C. The solid oxide electrolyzer cell 202 may be tubular or planar in assembly. The solid oxide electrolyzer cell 202 is partitioned into an anode side and a cathode side by a hermetic membrane comprising a solid oxide electrolyte. Alternating-current (AC) electrical power is converted into direct current (DC) electric power by an AC-DC converter, and the direct current electric power is supplied to the solid oxide electrolyzer cell 202. The electrical energy facilitates the conversion (electrolysis) of the high-temperature steam supplied to the cathode side into molecular hydrogen and negative oxygen ions. Oxygen ions pass through the solid oxide electrolyte to the anode, where they combine to form molecular oxygen.

In one embodiment, the solid oxide electrolyzer cell 202 uses an electrolyte that comprises yttria-stabilized-zirconia (YSZ), gadolinia-doped-ceria, samaria-doped-ceria, or lanthanum-strontium-gallium-magnesium oxide. Suitable anode materials include mixed-ionic-electronic-conducting (MIEC) ceramics such as lanthanum-strontium-ferrite, lanthanum-strontium-cobaltite, or lanthanum-strontium-cobaltite-ferrite, and their combinations with an electrolyte material such as those listed above.

In an example according to this embodiment, the solid oxide electrolyzer cell 202 can further comprise an ion-conducting barrier layer to separate the anode from the electrolyte. For example, a suitable barrier layer that can be used between a YSZ electrolyte and a lanthanum-strontium-cobaltite-ferrite includes samaria-doped-ceria and gadolinia-doped-ceria. Suitable cathode materials include the composite Ni/YSZ. In one embodiment, the Ni/YSZ is used at the operating temperature. In an example according to this embodiment, the solid oxide electrolyzer cell 202 can further comprise a reducing environment maintained on the cathode side. For example, maintaining hydrogen in the steam feed of at least about 5 mole percent can provide a reducing environment on the cathode side.

In another embodiment, the solid oxide electrolyzer cell 202 uses an electrolyte-supported design. In one embodiment, the thickness of the electrolyte is about 10 micrometers to about 400 micrometers, more specifically about 25 micrometers to about 300 micrometers, most specifically about 50 micrometers to about 200 micrometers. The electrolyte can be fabricated by tape-casting, pressing, extruding, slip-casting, tape-calendaring, sintering, or the like, or a combination comprising at least one of the foregoing. The thickness of the cathode and anode are each independently about 1 micrometer to about 200 micrometers, more specifically about 5 micrometers to about 100 micrometers, most specifically about 10 micrometers to about 50 micrometers. The electrodes can be fabricated by screen printing, wet particle spraying, tape-calendaring, tape-casting, sintering, or the like, or a combination comprising at least one of the foregoing.

In another embodiment, the solid oxide electrolyzer cell 202 uses a cathode-supported design. In this embodiment, the thickness of the cathode is about 25 micrometers to about 2000 micrometers, more specifically about 50 micrometers to about 1000 micrometers, most specifically about 200 micrometers to about 500 micrometers.

The cathode can be fabricated by tape-casting, pressing or tape-calendaring and sintering.

The thickness of the electrolyte can be about 1 micrometer to about 100 micrometers, more specifically about 2 micrometers to about 50 micrometers, and most specifically about 5 micrometers to about 15 micrometers. The electrolyte can be fabricated by tape-casting, tape-calendaring, screen-printing, or wet particle spraying and sintering. In some cases, the cathode and electrolyte are co-sintered.

The thickness of the anode can be about 2 micrometers to about 200 micrometers, more specifically about 5 micrometers to about 100 micrometers, most specifically about 10 micrometers to about 50 micrometers. The anode can be fabricated by pressing, screen printing, wet particle spraying, tape-calendaring, tape-casting, sintering, or the like, or a combination comprising at least one of the foregoing.

As noted above, the second loop 200 may comprise a steam methane reformer or a radiator (not shown) in lieu of the solid oxide electrolyzer cell 202. The steam methane reformer is located downstream of the heat recovery steam generator 112 and is in fluid communication with the heat recovery steam generator. The steam methane reformer is operative to produce hydrogen from natural gas.

In another embodiment, the steam radiator is located downstream of the heat recovery steam generator 112 and in fluid communication with the heat recovery steam generator 112. The steam radiator is operative to heat a building.

In one embodiment, the first loop 100 is in operative communication with the second loop 200 via a steam superheater 104. The steam superheater is upstream of the turbine 106 and is in fluid communication with turbine. In one embodiment, the steam superheater 104 can be a shell-and-tube type heat exchanger that facilitates the transfer of heat from hot helium to the steam present inside the tubes. In another embodiment, the steam superheater can be a plate-fin type heat exchanger that facilitates the transfer of heat from hot helium on one side of the plates to the steam to steam present on the other side of the plates.

In one embodiment, the first loop 100 comprises a recuperator 116 that is operative to transfer heat from the hot helium exiting the HRSG 112 to the cold helium exiting the compressor 124. The hot side of the recuperator 116 is located downstream of the HRSG 112 and is in fluid communication of the HRSG 112. The cold side of the recuperator is located downstream of the compressor 124 and is in fluid communication with the compressor 124. In one embodiment, the recuperator 116 is a gas-to-gas heat exchanger. In an exemplary embodiment, the recuperator 116 is a brazed plate-fin type heat exchanger.

In one embodiment, the first loop 100 comprises an intercooler 122 that is operative to cool helium exiting the low-pressure compressor 120 prior to further compression in the high-pressure compressor 124. In one embodiment, the intercooler 122 is a shell-and-tube type heat exchanger, with cooling water passing through the tubes to extract heat from the helium.

Helium exiting the nuclear reactor heat source 102 generally has a pressure of about 40 to about 90 kg/cm$^2$ and a temperature of about 700 to about 1,000° C. In one embodiment, the helium exits the nuclear reactor heat source at a pressure of about 50 to about 75 kg/cm$^2$ and a temperature of about 800 to about 950° C. In an exemplary embodiment, the helium exits the nuclear reactor heat source at a pressure of about 52 to about 57 kg/cm$^2$ and a temperature of about 825 to about 875° C. As can be seen from FIG. 1, the hot helium is transferred to the turbine 106 and the HRSG 112. If a superheater 104 is included upstream of the turbine 106 as in the FIG. 2, then hot helium is first transferred to the superheater 104 prior to being transferred to the turbine 106. The hot helium is used to heat steam to a temperature of about 400 to about 900° C. The pressure of the steam in the second loop is lower than or equal to the pressure of the helium in the first closed loop.

The helium exits the superheater 104 at a temperature of about 600 to about 900° C. and at a pressure of about 40 to about 90 kg/cm$^2$. An exemplary temperature for the helium exiting the superheater 104 is about 750 to about 850° C. and an exemplary pressure is about 50 kg/cm$^2$ to about 60 kg/cm$^2$. Helium is transferred to the high-pressure turbine 104 from the first superheater 106. The high-pressure turbine 106 is in mechanical communication with a low-pressure gas compressor, a high-pressure gas compressor and an electrical generator. Heated helium from the reactor expands through the turbine to drive the generator and gas compressors. The helium pressure decreases from about 50 to about 90 kg/cm$^2$ prior to entering the turbine 106 to about 4 to about 12 kg/cm$^2$ after exiting the turbine 106. The temperature drops from about 600 to about 900° C. prior to entering the gas turbine 106 to about 200 to about 500° C., after exiting the turbine 106. An exemplary pressure for the helium exiting the turbine is about 6 to about 9 kg/cm$^2$ and an exemplary temperature is about 250 to about 300° C.

The helium after the expansion is transferred to the HRSG 112. Heat from the helium is extracted in the HRSG 112 and is used to generate steam that is optionally used for the generation of hydrogen in the solid oxide electrolyzer cell 202. As noted above, in an exemplary embodiment, the HRSG 112 comprises a steam superheater 110, an evaporator 113 and an economizer 114. The temperature of the helium is further reduced in the process of transferring its heat to the steam generated in the HRSG 112. The helium temperature generally decreases to about 100 to about 300° C. at the exit point of the HRSG 112, while the pressure of the helium also decreases slightly. An exemplary temperature for helium exiting the heat exchanger 108 is about 200 to about 225° C.

In one embodiment, helium exiting the HRSG 112 is then transferred to the hot side of a recuperator 116. The temperature of the helium exiting the hot side of the recuperator is decreased to about 100 to about 300° C.

The helium is then transferred to the waste heat removal heat exchanger 118. In one embodiment, the temperature of the helium exiting the waste heat removal heat exchanger is decreased to about 20 to about 75° C. In an exemplary embodiment, the temperature of the helium exiting the waste heat removal heat exchanger is decreased to about 25 to about 40° C.

In one embodiment, the helium is then transferred to a low-pressure compressor 120. The low-pressure compressor compresses the helium to a pressure of about 15 to about 30 kg/cm$^2$, increasing the helium temperature to about 150 to about 250° C. In an exemplary embodiment, the helium exits the low-pressure compressor at a pressure of about 18 to about 22 kg/cm$^2$ and a temperature of about 190 to about 220° C.

In one embodiment, the helium is then transferred to an intercooling heat exchanger 122. Helium exiting the intercooling heat exchanger 122 is cooled to about 25 to about 75° C. In an exemplary embodiment, helium exiting the intercooling heat exchanger 122 is cooled to about 30 to about 45° C.

In one embodiment, the helium is then transferred to a high-pressure compressor 124. The high-pressure compressor further compresses the helium to a pressure of about 40 to about 90 kg/cm$^2$, increasing the helium temperature to about 150 to about 250° C. In an exemplary embodiment, the helium exits the high-pressure compressor at a pressure of about 50 to about 60 kg/cm$^2$ and a temperature of about 190 to about 220° C.

In one embodiment, the helium is then transferred to the cold side of a recuperator. The temperature of the helium exiting the cold side of the recuperator is increased to about 150 to about 300° C.

In one embodiment, the amount of electricity generated by the electrical generator is about 8,000 to about 15,000 kilojoules of electricity per kilogram of steam generated. In an exemplary embodiment, the amount of electricity generated by the electrical generator is about 9,000 to about 10,000 kilojoules of electricity per kilogram of steam generated.

In one embodiment, the second loop 200 of the system is in operative communication with the first loop 100 and comprises an optional solid oxide electrolyzer cell 202 that is used to electrolyze steam at a temperature of about 700 to about 900° C. to form hydrogen and oxygen. As can be seen from the FIG. 2, the second loop 200 comprises the HRSG 112, the superheater 104 and a solid oxide electrolyzer cell 202. The solid oxide electrolyzer cell 202 comprises a cathode side and an anode side. Steam is electrolyzed to generate hydrogen on the cathode side, while oxygen generated may be swept away on the anode side by compressed air obtained from an air compressor (not shown). On the cathode side, the second loop 200 can comprise other devices such as, for example, condensers (not shown) for separating steam from hydrogen, heat exchangers (not shown) for extracting heat from hydrogen and steam to preheat air used to sweep oxygen from the anode side, feed water heaters for preheating water, or the like. On the anode side, the second loop 200 can comprise other devices, such as for example, compressors (not shown) for compressing air to sweep oxygen from the anode side, turbines (not shown) for driving an electrical generator (not shown) that is used to generate electricity, or the like.

In the second loop 200, water enters the HRSG 112 at a temperature of about 25° C. and a pressure less than or equal to the pressure of the helium exiting the turbine 106. In one embodiment, steam leaves the HRSG 112 at a temperature of about 200 to about 400° C. and a pressure and a pressure less than or equal to the pressure of the helium exiting the turbine 106. In an exemplary embodiment, steam leaves the HRSG 112 at a temperature of about 250 to about 275° C. and a pressure less than or equal to the pressure of the helium exiting the turbine 106.

In one embodiment, steam exits the steam superheater 104 at a temperature of about 400 to about 900° C. and a pressure less than or equal to the pressure of the helium exiting the turbine 106. In an exemplary embodiment, steam exits the steam superheater 104 at a temperature of about 700 to about 775° C. and a pressure less than or equal to the pressure of the helium exiting the turbine 106

In one embodiment, the hydrogen and oxygen derived from the solid oxide electrolysis system 200 can be stored in hydrogen and oxygen tanks respectively for use in a reversible type solid oxide electrolytic cell (not shown) that serves as a fuel battery to generate electricity as the occasion demands.

The hydrogen obtained from solid oxide electrolyzer cell 202 has a purity of greater than or equal to about 90%, based on the moles of the hydrogen and any impurities present. In one embodiment, the hydrogen obtained has a purity of greater than or equal to about 95%, based on the moles of the hydrogen and any impurities present. In another embodiment, the hydrogen obtained has a purity of greater than or equal to about 98%, based on the moles of the hydrogen and any impurities present. In another embodiment, the hydrogen obtained has a purity of greater than or equal to about 99%, based on the moles of the hydrogen and any impurities present. In another embodiment, the hydrogen obtained has a purity of greater than or equal to about 99.9%, based on the moles of the hydrogen and any impurities present.

The aforementioned method of generating hydrogen is advantageous in that the use of a direct Brayton cycle can be used to produce electricity as well as low pressure, high temperature steam for a solid oxide electrolyzer system. The system is self-contained in that no electricity or steam is exported or imported from external devices.

Since the helium is always at higher pressure than the steam at all points in the system, the risk of water ingress from the second loop 200 into the first loop 100 (that contains only helium) is minimized, especially when compared with systems that employ a Rankine cycle. The disclosed balanced system 10 also employs a lower helium mass flow rate, lower helium coolant return temperatures and lower system pressures than direct Brayton cycle systems that produce only electricity. This permits simplification of the nuclear reactor design as well as materials of construction used in the nuclear reactor.

The following examples, which are meant to be exemplary, not limiting, illustrate the methods of operation of the system described herein.

EXAMPLE

This numerical example has been performed to demonstrate one exemplary method of functioning the system. This example has been conducted to demonstrate the advantages that are available by generating electricity along with steam according to the disclosed method.

Figure 3:
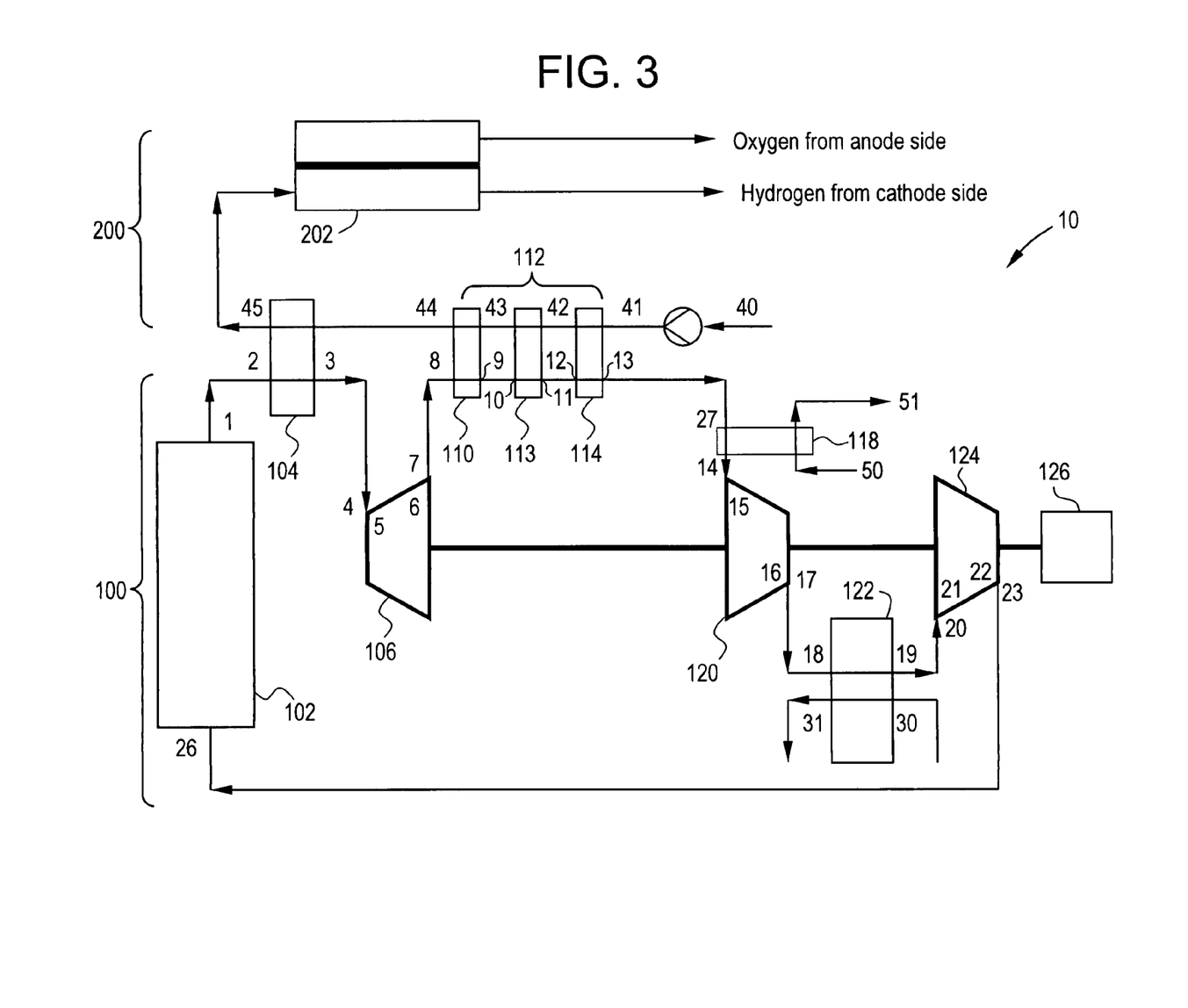
FIG. 3 is a depiction of one exemplary embodiment of a self-sufficient system for generating hydrogen; wherein the pressure, temperature and mass flow at various points in the system are shown in the Tables 1 and 2.

FIG. 3 is a depiction of the system upon which the numerical example was performed. FIG. 3 comprises the same elements depicted in the FIG. 2, with the exception of the recuperator 116. Each element in the FIG. 3 however, has its inlet and outlet points numbered. Table 1 shows the respective values (at each of the inlet and outlet points) for the helium pressure, temperature and mass flow rate for an optimized system that generates electricity and steam. Table 2 shows the respective values (at each of the inlet and outlet points) for the water/steam pressure, temperature and mass flow rate for an optimized system that generates electricity and steam.

TABLE 1

| Point # | Pressure (kg/cm$^2$) | Temperature (° C.) | Mass flow rate (kg/second) |
|---|---|---|---|
| 1 | 53.86 | 850 | 180 |
| 2 | 53.75 | 850 | 180 |
| 3 | 52.67 | 830.1 | 180 |
| 4 | 52.57 | 830.1 | 180 |
| 5 | 52.52 | 830.1 | 180 |
| 6 | 7.67 | 279.7 | 180 |
| 7 | 7.617 | 279.7 | 180 |
| 8 | 7.601 | 279.7 | 180 |
| 9 | 7.449 | 274.9 | 180 |
| 10 | 7.442 | 274.9 | 180 |
| 11 | 7.293 | 232 | 180 |
| 12 | 7.286 | 232 | 180 |
| 13 | 7.14 | 221.5 | 180 |
| 14 | 6.997 | 31 | 180 |
| 15 | 6.983 | 31 | 180 |
| 16 | 19.89 | 210.7 | 180 |
| 17 | 19.75 | 210.7 | 180 |
| 18 | 19.71 | 210.7 | 180 |
| 19 | 19.51 | 31 | 180 |
| 20 | 19.48 | 31 | 180 |
| 21 | 19.46 | 31 | 180 |
| 22 | 55.41 | 212.8 | 180 |
| 23 | 55.11 | 212.8 | 180 |
| 26 | 55.00 | 212.8 | 180 |
| 27 | 7.14 | 221.5 | 180 |

TABLE 2

| Point # | Pressure (kg/cm$^2$) | Temperature (° C.) | Mass flow rate (kg/second) |
|---|---|---|---|
| 40 | 1.0 | 25 | 18.81 |
| 41 | 6.8 | 25.04 | 18.81 |
| 42 | 6.6 | 148.2 | 18.81 |
| 43 | 6.4 | 161.4 | 18.81 |
| 44 | 6.2 | 267.2 | 18.81 |
| 45 | 6.0 | 725 | 18.81 |

From the Tables 1 and 2, it can be seen that while the mass flow of helium is maintained at about 180 kilograms/second in the first loop 100, mass flow of steam of about 18.81 kilograms/second can be maintained in the second loop. The helium flow in the first loop can be used to generate electricity of about 8,000 to about 10,000 kilojoules per kilogram of steam. From Table 2, it may also be seen that the helium can be used to raise the temperature of steam from room temperature (25° C.) to about 725° C., which is sufficient to permit electrolysis of steam to obtain hydrogen and oxygen in a solid oxide electrolyzer cell 202.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A system for producing electricity and steam comprising:
   a Brayton power conversion cycle employing helium as a working fluid in a first closed loop wherein the first closed loop comprises:

a heat source comprising a nuclear reactor; wherein a core of the nuclear reactor is cooled using helium;

a power conversion system comprising a turbine, a compressor, and an electrical generator, wherein the compressor, the turbine, and the electrical generator are in operative communication with each other; wherein the turbine is located downstream from the heat source and is in fluid communication with the heat source, and the turbine is a high pressure turbine that receives helium at a pressure in the range of about 50 to about 90 kg/cm2;

a heat recovery steam generator, located downstream of the turbine and in fluid communication with the turbine, where the steam generated is at a pressure that is less than or equal to about the pressure of the helium in the first closed loop; and a waste heat removal heat exchanger, located downstream of the heat recovery steam generator and in fluid communication with the heat recovery steam generator wherein, the heat recovery steam generator is operative to extract heat from helium and superheat the steam to a temperature of about 200 to 400° C. and a pressure of about 4 to about 12 kg/cm2.

2. The system of claim 1, further comprising a second loop in operative communication with the first loop, wherein the second loop employs water and steam as the working fluid.

3. The system of claim 1, wherein the first closed loop further comprises a steam superheater located downstream of the heat source and in fluid communication with the heat source, located upstream of the turbine and in fluid communication with the turbine; wherein the steam superheater is operative to extract heat from helium and superheat steam to a temperature of about 400 to 900° C. and a pressure of about 4 to about 12 kg/cm2.

4. The system of claim 2, further comprising a solid oxide electrolyzer cell or cells located downstream of the heat recovery steam generator and in fluid communication with the heat recovery steam generator; wherein the solid oxide electrolyzer cell is operative to electrolyze steam and convert it to hydrogen and oxygen.

5. The system of claim 1, further comprising a steam turbine located downstream of the heat recovery steam generator and in fluid communication with the heat recovery steam generator; wherein the steam turbine is operative to generate electricity.

6. The system of claim 2, further comprising a steam methane reformer located downstream of the heat recovery steam generator and in fluid communication with the heat recovery steam generator; wherein the steam methane reformer is operative to produce hydrogen from natural gas.

7. The system of claim 2, further comprising a steam radiator located downstream of the heat recovery steam generator and in fluid communication with the heat recovery steam generator; wherein the steam radiator or radiators are operative to heat a building or buildings.

8. The system of claim 1, wherein the first closed loop further comprises an economizer located downstream of the Heat Recovery Steam Generator and in fluid communication with the Heat Recovery Steam Generator; wherein the economizer is operative to extract heat from helium and heat water to a temperature of about 100 to 200° C. and a pressure of about 4 to about 12 kg/cm2.

9. The system of claim 1, wherein the first closed loop further comprises a recuperator.

10. The system of claim 9, wherein a hot side of the recuperator is located downstream of the heat recovery steam generator and upstream of the compressor, and is in fluid communication with the heat recovery steam generator and the compressor; wherein a cold side of the recuperator is located downstream of the compressor and upstream of the nuclear reactor, and is in fluid communication with the compressor and nuclear reactor; wherein the recuperator is operative to extract heat from the hot side helium and transfer it to the cold side helium.

11. The system of claim 1, wherein the first closed loop further comprises an intercooler.

12. The system of claim 11, wherein the intercooler is located downstream of a low pressure compressor and upstream of a high pressure compressor and is in fluid communication with the low pressure compressor and the high pressure compressor; wherein the intercooler is operative to extract heat from the helium.

13. The system of claim 1, wherein electricity generated by the generator is supplied to a solid oxide electrolyzer cell to facilitate electrolysis of steam to hydrogen.

14. The system of claim 13, wherein the amount of electricity generated is about 8,000 to about 15,000 kilojoules per kilogram of steam generated.

15. The system of claim 1, wherein the system does not export or import electricity or steam from or to an external source.

16. The system if claim 1, wherein the turbine is a helium turbine and wherein the compressor is a helium compressor.

* * * * *

UNITED STATES PATENT AND TRADEMARK OFFICE
CERTIFICATE OF CORRECTION

PATENT NO.         : 7,436,922 B2                                       Page 1 of 1
APPLICATION NO.    : 11/313502
DATED              : October 14, 2008
INVENTOR(S)        : Peter It is certified that error appears in the above-identified patent and that said Letters Patent is hereby corrected as shown below:

In Column 11, Line 10, in Claim 1, delete "kg/cm2;" and insert -- $kg/cm^2$; --, therefor.

In Column 11, Line 22, in Claim 1, delete "kg/cm2." and insert -- $kg/cm^2$. --, therefor.

In Column 11, Line 33, in Claim 3, delete "kg/cm2." and insert -- $kg/cm^2$. --, therefor.

In Column 12, Line 14, in Claim 8, delete "kg/cm2." and insert -- $kg/cm^2$. --, therefor.

In Column 12, Line 44, in Claim 16, delete "if claim" and insert -- of claim --, therefor.

Signed and Sealed this

Twenty-fourth Day of February, 2009

JOHN DOLL
*Acting Director of the United States Patent and Trademark Office*